United States Patent [19]

Kawaguchi

[11] Patent Number: 5,245,991

[45] Date of Patent: Sep. 21, 1993

[54] APPARATUS FOR SUPPORTING DEEP BREATHING AND CHECK VALVE FOR THE SAME

[75] Inventor: Hirozumi Kawaguchi, Arita, Japan

[73] Assignee: Kawaei Co., Ltd., Arita, Japan

[21] Appl. No.: 899,311

[22] Filed: Jun. 16, 1992

[51] Int. Cl.$^5$ .................. A61M 16/20; A61B 5/093
[52] U.S. Cl. .................. 128/200.24; 482/13; 137/223; 128/728
[58] Field of Search .......... 128/728, 200.24, 204.25, 128/203.12, 202.28, 202.29, 201.13, 203.18, 203.23, 203.24, 203.25, 204.11, 204.17, 207.16; 137/223, 230, 797, 798, 799, 802; 251/85, 212, 349, 350, 341, 342, 369; 604/247, 245, 256; 446/224, 220; 482/13

[56] References Cited

U.S. PATENT DOCUMENTS

| | | | |
|---|---|---|---|
| 225,710 | 3/1880 | Marsh | 128/728 |
| 262,517 | 3/1882 | Unz | 446/220 |
| 563,287 | 7/1896 | Lane | 137/223 |
| 564,502 | 7/1896 | Brookes | 137/223 |
| 1,008,641 | 11/1911 | Gregory | 137/223 |
| 1,315,955 | 9/1919 | Gill | 446/224 |
| 3,455,294 | 7/1969 | Adler | 128/201.18 X |
| 3,949,984 | 4/1976 | Navara | 446/220 X |
| 4,275,722 | 6/1981 | Sorensen | 128/200.24 |
| 4,795,426 | 1/1989 | Jones | 604/51 |

FOREIGN PATENT DOCUMENTS

| | | | |
|---|---|---|---|
| 391922 | 6/1908 | France | 137/223 |
| 719244 | 2/1932 | France | 137/223 |
| 2062470 | 5/1981 | United Kingdom | 128/728 |

*Primary Examiner*—Edgar S. Burr
*Assistant Examiner*—Eric P. Raciti
*Attorney, Agent, or Firm*—Wenderoth Lind & Ponack

[57] ABSTRACT

A therapeutic apparatus for promoting deep breathing in a user has an elastic bag capable of expanding and contracting, the bag having an inlet, and a pipe with a bag engaging flange around one end connected to the bag inlet and a normally closed check valve on the one end for preventing air in the bag from escaping when the check valve is closed. The one end of the pipe and the check valve are made of elastic material and the normally closed check valve has the surface engaged with the pipe defined by a spiral cut around the periphery of the pipe, and the valve is operable by bending the pipe to open the spiral cut.

1 Claim, 3 Drawing Sheets

5,245,991

APPARATUS FOR SUPPORTING DEEP BREATHING AND CHECK VALVE FOR THE SAME

FIELD OF THE INVENTION

The present invention relates to an apparatus for supporting deep breathing.

PRIOR ART

It is well known that oxygen is necessary for human brain cells to actively function. It is also well known that taking ample oxygen into the body is good for maintaining one's health.

Oxygen must be present in a body in the first place for supplying oxygen in brain cells. Taking in oxygen is carried out following active physical movement by unconsciously carrying out heavy breathing so as to take a large amount of air into the body and by means of conscious deep breathing.

However, most oxygen taken in the body by means of the heavy breathing after the active physical movement is supplied to the muscular tissue, and not very much oxygen is carried to the brain.

Taking a deep breath under the condition of little physical movement is very effective since a large amount of oxygen is taken into the body. However it is very difficult to consciously take a deep breath in the present busy social environment.

SUMMARY OF THE INVENTION

For the purpose of overcoming the above-mentioned conventional problems, the present invention provides an apparatus for consciously taking a deep breath by easy operations, by which a continuous pattern of deep breathing for a certain period of time can be easily carried out and abdominal muscular pressure necessary to live can be increased and further the effect of the increased abdominal muscular pressure can become visible.

The inventor, as a result of his research, has discovered that by practicing deep breathing (abdominal breathing) as a fundamental way to maintain one's health, abdominal muscular pressure and temperature can be raised, digestion and absorption of foods can be improved, and all the physical functions can be made to become active, thereby promoting health. However, it is difficult to practice deep breathing in the right way in everyday life. It has been found that this results from a difficulty in continuing to practice deep breathing though it is recognized to be good for health, since in consciously practicing deep breathing in ordinary life, exhaled breath is invisible and the amount of the exhaled breath cannot be confirmed. The inventor's further research found out that the right way of breathing can be mastered in an interesting way by expanding a balloon-like bag made for practicing the right way of breathing and the present invention was thus completed.

In the present invention there is provided a bag capable of expanding and contracting, a pipe for blowing air connected with the inlet of the bag and a check valve provided over an air-discharge hole of the pipe, the air-discharge hole of the pipe and the vicinity of the check valve being formed of an elastic material, and a spiral cut around the periphery of the pipe to separate the air-discharge hole of the pipe and the check valve.

Further, according to the present invention, the check valve defined by the spiral cut formed around the air-discharge hole of the pipe made of an elastic material leaves a spiral hinge connecting along an uncut portion of the pipe, so that the check valve forms a valve plug connected to the pipe through the hinge.

BRIEF DESCRIPTION OF THE DRAWINGS

The manner in which the foregoing and other objects of this invention are accomplished will be apparent from the accompanying specification and claims considered together with the drawings, wherein:

OPERATION

According to the present invention, a check valve is moved to an open state by pressing from the outside in the vicinity of the check valve on a pipe made of an elastic material and an expanded bag can be contracted by having the air flow backward from the inside of the bag to the pipe.

Since a cut between the check valve and the pipe is spiral, resistance for opening and closing of the check valve against the pipe is reduced by forming the cut almost throughout the whole circumference of the pipe in the direction of its periphery. Accordingly, the check valve is in the open state if the vicinity of the check valve is pressed with only comparatively weak force.

Furthermore, since the ends of the spiral cut do not cross each other, a hinge connecting the check valve and the pipe has a sufficient durability against a repeated elastic deformation of the vicinity of the check valve, and as a result, the quality of the hinge is maintained for a long term.

Moreover, since the spiral cut is formed almost throughout the whole circumference of the pipe as mentioned above, the check valve is easily moved to the open state even if the vicinity of the check valve is pressed from any direction, and the operational quality is improved.

DETAILED DESCRIPTION OF THE PREFERRED EMBODIMENT

A preferred embodiment of the present invention will now be explained with reference FIGS. 1 through 5.

Figure 1:
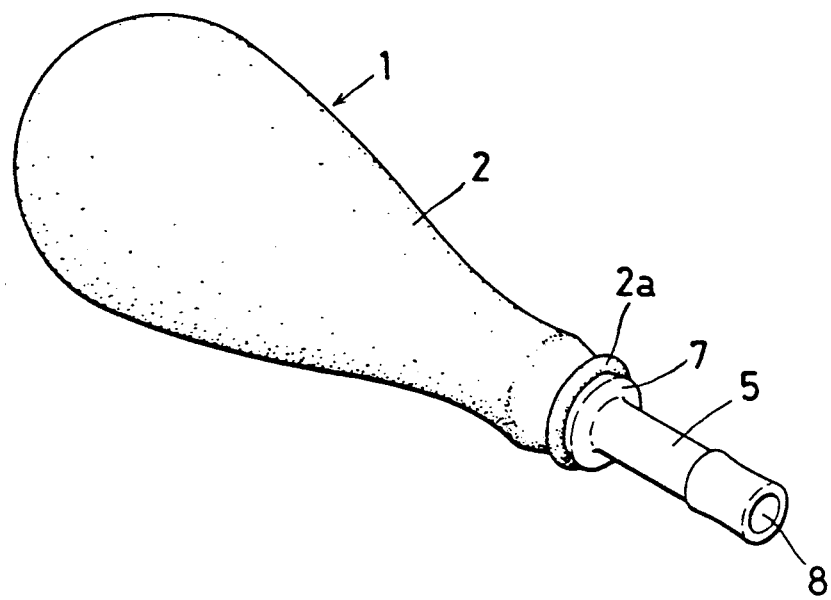
FIG. 1 is a perspective view showing an apparatus for supporting deep breathing according to a first example of the present invention.
Figure 2:
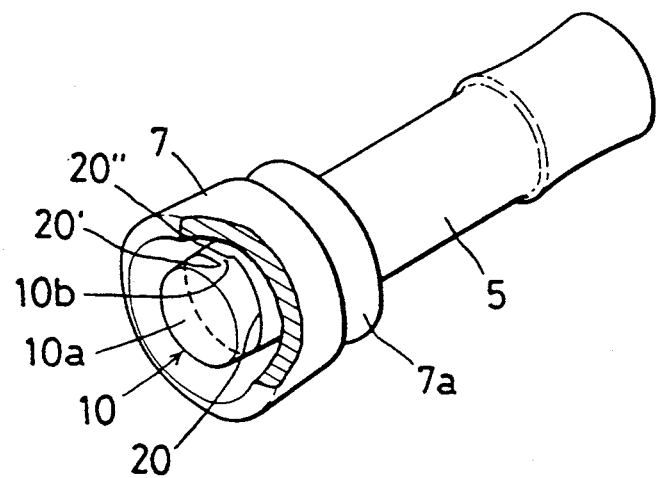
FIG. 2 is a perspective view of main components of the apparatus shown in FIG. 1.

In FIG. 1, there is shown an apparatus for supporting deep breathing 1 which basically comprises a rubber balloon (bag) 2 capable of expanding and contracting, a pipe 5 for blowing air connected to an inlet 2a of the rubber balloon 2 and a check valve 10 provided on an air-discharge hole 9 of the pipe 5 shown in FIG. 2.

Figure 3:
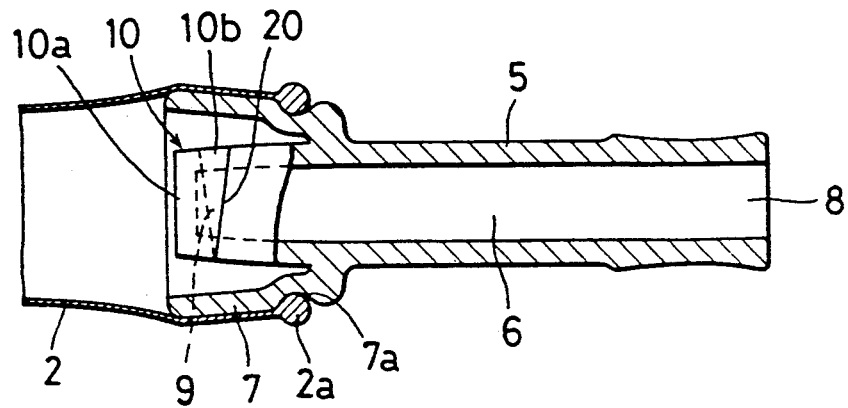
FIG. 3 is an enlarged longitudinal sectional view of main components of the apparatus shown in FIG. 1.

The whole of the pipe 5 is formed of soft synthetic resin such as rubber, urethane and the like and includes, as shown in FIG. 3, an air passage 6, the check valve 10 and a flange part 7. 8 denotes an air-inlet hole for blowing in air.

The check valve 10 provided on the air-discharge hole 9 of the pipe as mentioned above comprises a bellows-like valve plug 10a capable of opening and closing which covers the air-discharge hole 9 of the pipe 5 and a hinge 10b connecting the valve plug 10a and the pipe 5.

At the vicinity of the air-discharge hole 9 of the pipe in the above, a cut 20 for defining the check valve is formed spirally almost throughout the whole circumference of the pipe 5 in the direction of its periphery. The valve plug 10a of the check valve 10 and the pipe are connected through the part of the pipe uncut by the spiral cut 20 and both ends 20' and 20" of the cut 20 are located parallel without crossing each other. Therefore, the part between both the ends 20' and 20" of the cut 20 becomes the hinge 10b, which is a spiral hinge which connects the pipe 5 and the valve plug 10a.

At the outer periphery of the pipe 5, the flange part 7 having substantially an L-shaped section is formed throughout the whole circumference of the pipe in the direction of its periphery. The inlet 2a of the rubber balloon 2 is engaged with the outer surface of the flange part 7 and held securely by a step part 7a.

Since the above entire pipe 5 is formed integrally of soft synthetic resin, as is described later, under the condition of elastic deformation of the flange part 7 and the check valve 10, the valve plug 10a opens and a counter flow of the air from the rubber balloon 2 to the inside of the pipe 5 is allowed and under the condition of elastic return, when force causing deformation is released, the valve plug 10a closes and a counter flow of the air from the rubber balloon 2 to the inside of the pipe 5 is stopped.

The operation of the above-described example will now be explained.

Figure 4:
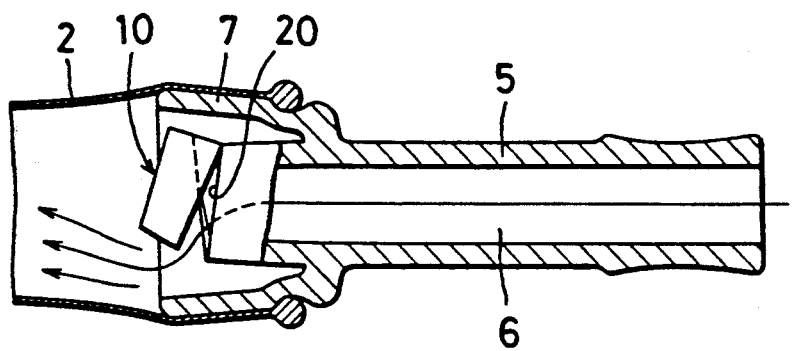
FIG. 4 is an enlarged longitudinal sectional view showing the open state of a check valve of the apparatus shown in FIG. 3.

Firstly, a user holds the air-inlet hole 8 of the pipe 5 in his mouth and after inhaling air deeply, he blows the air into the air-inlet hole 8 such that the blown air opens the check valve plug 10 and flows into the rubber balloon 2 as shown in FIG. 4. The rubber balloon 2 is thus expanded. At this time, even if the blowing is stopped or his mouth is separated from the air-inlet hole 8, the check valve plug 10 functions to prevent a counter flow of the air from the rubber balloon 2, whereby the rubber balloon 2 is kept expanded. The air is repeatedly blown into the rubber balloon 2 in this way such that the balloon 2 is made very big.

Figure 5:
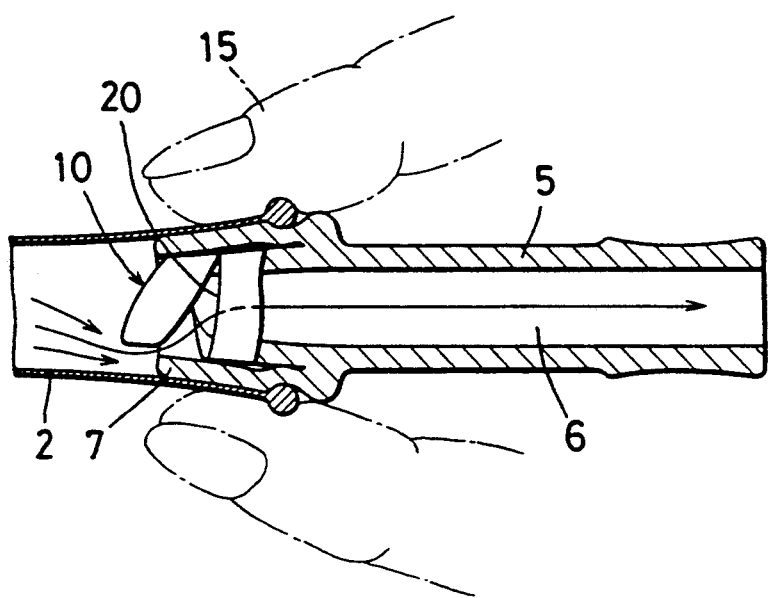
FIG. 5 is a longitudinal sectional view showing the condition of elastic deformation of a pipe of the apparatus shown in FIG. 3.

When the rubber balloon 2 reaches a certain size, the flange part 7 is pressed with fingers as illustrated in FIG. 5. Due to this, the flange part 7 and the check valve 10 are deformed elastically in a flat manner to cause pressure leakage, whereby the valve plug 10a is opened to open the air-discharge hole 9. Accordingly, the air collected in the rubber balloon 2 flows backward in the direction shown by arrows and the rubber balloon 2 contracts quickly.

After letting the air out of the rubber balloon 2 in this way, the pressure on the flange part 7 with the fingers 15 is relaxed. Due to this, each of the flange part 7 and the vicinity of the check valve 10 is elastically returned to its normal shape and the valve plug 10a is then closed to return to its original position.

According to the above-described structure, since the cut 20 between the check valve 10 and the pipe 5 is spiral, the cut 20 can be formed almost throughout the whole circumference of the pipe 5 in the direction of its periphery. Therefore, resistance to opening and closing of the check valve 10 against the pipe 5 is reduced and the check valve is in the open state if only the vicinity of the check valve is pressed with comparatively weak force.

Moreover, since the spiral cut 20 is formed almost throughout the whole circumference of the pipe 5, the check valve 10 can be easily in the open state even if the vicinity of the check vale 10 is pressed from any direction. Therefore, the quality of the operation is considerably improved and the practical value is increased.

Further, the two ends 20', 20" of the spiral cut 20 do not cross each other. Since the hinge 10b which connects the check valve 10 and the pipe 5 is spiral, the spiral hinge 10b has good durability against a repetition of the elastic deformation of the vicinity of the check valve 10, and as a result, the quality of the hinge is maintained for a long term.

If the cut 20 is not spiral but is merely a ring, both the ends 20', 20" of the cut 20 are eventually connected due to a repetition of the opening and closing of the check valve 10, and the check valve 10 itself may separate from the pipe 5.

As described above, since it is easy to operate and has a good durability, as a result of promoting practice of deep breathing, the abdominal muscular pressure necessary for maintaining one's health is increased, temperature is properly maintained and digestion and absorption of foods can be improved to make all the functions active, thereby improving health and additionally, if the user is on a diet, his weight can be reduced thereby properly. Further, since sufficient oxygen is always supplied to the user's brain, the brain can be kept clear.

Further, since the user can know at a glance to what degree he exhaled air by looking at the expansion of the rubber balloon 2, he can be convinced of the effect of practicing deep breathing, by which practice the improvement of health by taking a deep breath can be continued.

Moreover, because the air can be let out of the rubber balloon 2 to make it contract, this apparatus is convenient for portable use. Therefore, even in the case of travelling or the like, if this apparatus is put in a bag, deep breathing can be carried out anywhere, thus increasing the practical value.

In the present embodiment, the entire pipe 5 is formed integrally of soft synthetic resin, and therefore the production thereof is simple. Further, since the valve plug 10a of the check valve 10 can be formed simply by providing a cut at the end of the pipe 5, the production process is simplified and the production cost can be decreased.

Figure 6:
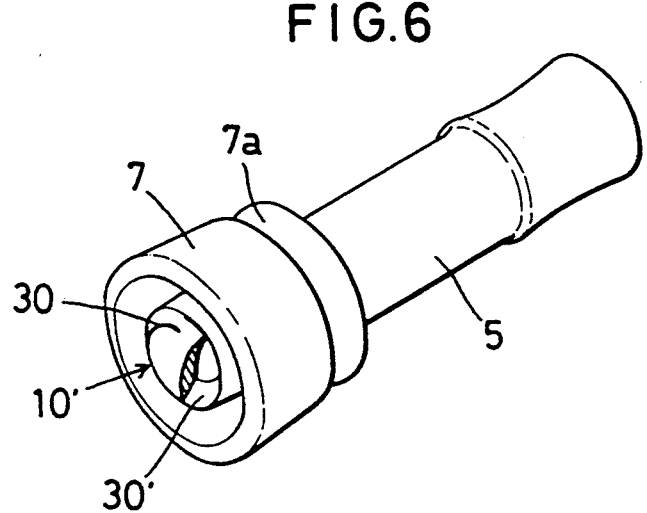
FIG. 6 is a perspective view showing a second example according to the present invention.
Figure 7:
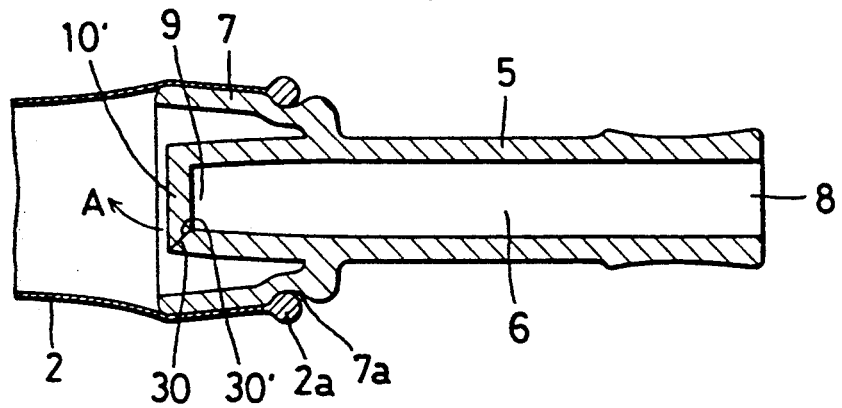
FIG. 7 is a longitudinal sectional view of the apparatus shown in FIG. 6.
Figure 8:
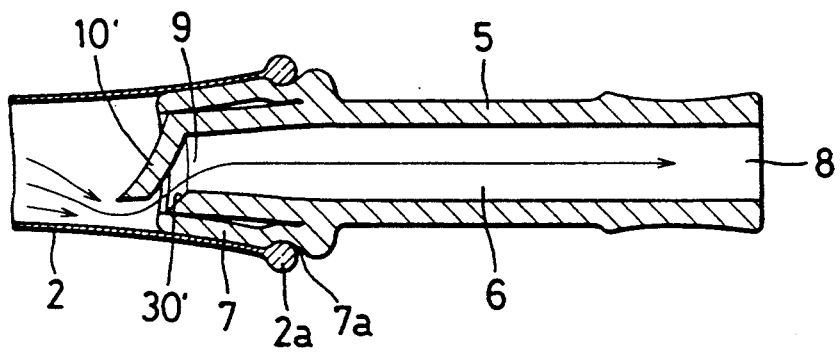
FIG. 8 is a longitudinal sectional view showing the condition of elastic deformation of a pipe shown in FIG. 6.

FIGS. 6 through 8 illustrate a second example of the present invention. In this example, a spiral cut 30 is not formed in the side of the pipe 5, but on the front thereof. A cut part 30, of the cut 30 is opened toward the inside of the rubber balloon 2 as shown in FIG. 7. Due to this, the check valve 10' opens only in the direction of arrow A and the same effect as the cases of FIGS. 4 and 5 can be obtained by pressing the flange part 7.

Figure 9:
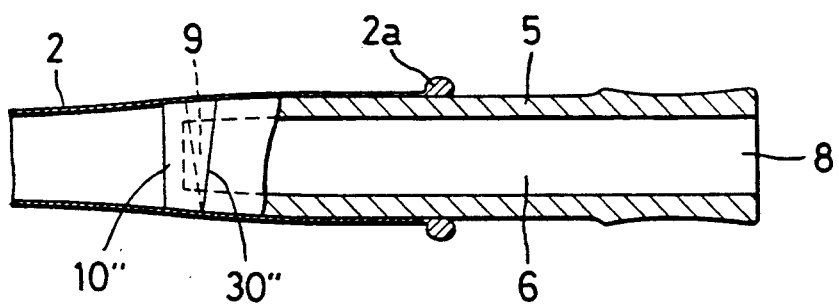
FIG. 9 is a longitudinal sectional view showing a third example according to the present invention.
Figure 10:
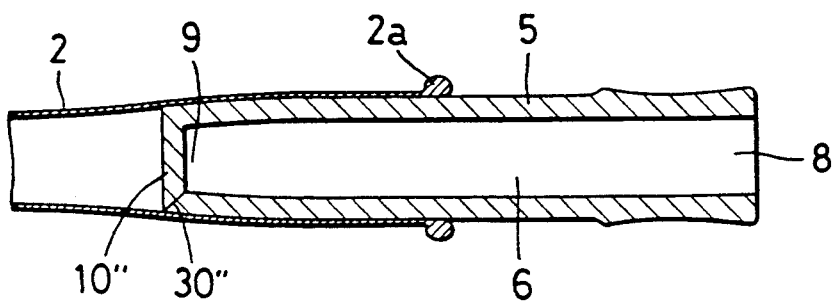
FIG. 10 is a longitudinal sectional view showing the vicinity of a cut shown in FIG. 9.

Furthermore, structures shown in FIGS. 9 and 10 wherein the flange part 7 is omitted can be employed. In these cases, the valve plug 10" can be opened and closed by pressing the vicinity of the valve plug 10".

In each aforementioned example, a rubber balloon is employed as a bag, but any other materials which expand by blowing in air may be employed. For example, a paper bag may be employed. Since a paper bag, unlike a rubber balloon, is not contractible, a user must make it collapse.

In each aforementioned example, the pipe 5 is formed integrally of soft synthetic resin, but a hard material may be used to form the vicinity of the air-inlet hole 8 of the pipe 5.

The check valve in each aforementioned example, needless to say, can be used in an apparatus which requires a check valve structure other than an apparatus for supporting deep breathing.

EFFECT OF THE INVENTION

As explained above, according to the present invention, since a check valve and a pipe are connected through a spiral cut, the check valve can be easily opened and the operational quality is improved. Moreover, since the hinge of the check valve is spiral connecting along the cut, the durability of the hinge is improved.

Accordingly, by using the apparatus of the present invention having durability and a good operational quality, as a result of mastering a method of deep breathing continuously, the abdominal muscular pressure necessary for maintaining one's health is increased, temperature is properly maintained and digestion and absorption of foods can be improved to make all the functions active, thereby improving one's health and, additionally, if the user is on a diet, the user's weight can be reduced thereby properly. Further since sufficient oxygen is always supplied to the user's brain, the brain can be kept clear.

Moreover, since the user can know at a glance to what degree he exhaled air by looking at the expansion of the rubber balloon, he can be convinced of the effect of practicing deep breathing, by which practice the improvement of health by taking a deep breath can be continued in an interesting way. Further, by letting the air out of the bag to make it contract, this apparatus can be made convenient for portable use. Therefore, even in the case of travelling or the like, if only this apparatus is put in a bag, deep breathing can be carried out anywhere, thus increasing the practical value of this apparatus.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A therapeutic apparatus for promoting deep breathing in a user, comprising:
    an elastic bag capable of expanding and contracting, said bag having an inlet;
    a pipe having a bag engaging flange around one end connected to said bag inlet, said one end having a normally closed check valve situated thereon for preventing air in said bag from escaping when said check valve is closed;
    said one end of said pipe and said normally closed check valve being comprised of elastic material; and
    said normally closed check valve having the surface engaged with said pipe defined by a spiral cut about the periphery of said pipe and being operable by bending said pipe to open said spiral cut.

* * * * *